US012394386B2

(12) United States Patent
Kim et al.

(10) Patent No.: US 12,394,386 B2
(45) Date of Patent: Aug. 19, 2025

(54) DISPLAY APPARATUS AND METHOD FOR CONTROLLING DISPLAY APPARATUS

(71) Applicant: SAMSUNG ELECTRONICS CO., LTD., Suwon-si (KR)

(72) Inventors: Doyoung Kim, Suwon-si (KR); Dongkeun Kim, Suwon-si (KR); Heehyo Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/611,997

(22) Filed: Mar. 21, 2024

(65) Prior Publication Data

US 2024/0233656 A1 Jul. 11, 2024

Related U.S. Application Data

(63) Continuation of application No. PCT/KR2022/017990, filed on Nov. 15, 2022.

(30) Foreign Application Priority Data

Nov. 16, 2021 (KR) ........................ 10-2021-0157893

(51) Int. Cl.
*G09G 3/34* (2006.01)
*G09G 3/36* (2006.01)

(52) U.S. Cl.
CPC ............. *G09G 3/3406* (2013.01); *G09G 3/36* (2013.01); *G09G 2320/0247* (2013.01); *G09G 2320/0626* (2013.01); *G09G 2354/00* (2013.01)

(58) Field of Classification Search
CPC .................................................... G09G 3/3233
See application file for complete search history.

(56) References Cited

U.S. PATENT DOCUMENTS 8,143,792 B2 3/2012 Joo et al.
9,093,011 B2 7/2015 Igawa
(Continued)

FOREIGN PATENT DOCUMENTS

KR 10-2007-0015857 2/2007
KR 10-2007-0074387 7/2007
(Continued)

OTHER PUBLICATIONS

European Search Report dated Oct. 8, 2024, issued in European Application No. EP 22 89 6021.
(Continued)

*Primary Examiner* — Nan-Ying Yang
(74) *Attorney, Agent, or Firm* — STAAS & HALSEY LLP

(57) ABSTRACT

A display apparatus is disclosed. The present display apparatus comprises: a display panel; a backlight unit configured to provide light to the display panel by using a plurality of light-emitting elements; a driver configured to provide a driving current to the plurality of light-emitting elements on the basis of an amplitude of a driving voltage; a memory storing information on an amplitude of a driving voltage according to a plurality of brightnesses for each resistance value of an output resistor connected to the driver; and a processor configured to set a resistance value of the output resistor on the basis of a brightness value of the display panel, identify an amplitude of the driving voltage corresponding to the brightness value of the display panel from among amplitudes of the driving voltage according to the plurality of brightnesses corresponding to the set resistance value on the basis of the information stored in the memory, and apply the driving voltage of the identified amplitude to the driver, wherein an amplitude of the driving current is
(Continued)

determined on the basis of the amplitude of the driving voltage and the resistance value of the output resistor.

12 Claims, 13 Drawing Sheets

(56) References Cited

U.S. PATENT DOCUMENTS

| | | | | |
|---|---|---|---|---|
| 9,997,113 | B2 | 6/2018 | Park et al. | |
| 10,499,472 | B2 | 12/2019 | Shuai et al. | |
| 2007/0109240 | A1 | 5/2007 | Jung | |
| 2007/0159447 | A1* | 7/2007 | Choi | G09G 3/3406 345/102 |
| 2013/0038819 | A1 | 2/2013 | Ishikawa | |
| 2018/0368220 | A1* | 12/2018 | Shuai | G09G 3/36 |
| 2021/0343233 | A1 | 11/2021 | Hyeon | |

FOREIGN PATENT DOCUMENTS

| | | |
|---|---|---|
| KR | 10-2010-0045846 | 5/2010 |
| KR | 10-1006385 | 1/2011 |
| KR | 10-1221210 | 1/2013 |
| KR | 10-2016-0087036 | 7/2016 |
| KR | 10-2017-0030144 | 3/2017 |
| KR | 10-1869823 | 6/2018 |
| KR | 10-2018-0090364 | 8/2018 |
| KR | 10-1990532 | 6/2019 |

OTHER PUBLICATIONS

International Search Report, PCT/ISA/210, dated Feb. 27, 2023, in PCT Application No. PCT/KR2022/017990.
Written Opinion, PCT/ISA/237, dated Feb. 27, 2023, in PCT Application No. PCT/KR2022/017990.
Office Action dated Feb. 18, 2025, issued in Korean Application No. 10-2021-0157893.

* cited by examiner

FIG. 8A

810

| BRIGHTNESS OF THE DISPLAY PANEL | $V_{Adim}(R_A)$ |
|---|---|
| 100(MAXIMUM BRIGHTNESS) | 3.33V |
| 99 | 3.30V |
| 98 | 3.27V |
| 97 | 3.24V |
| ... | ... |
| 34 | 1.32V |
| 33 | 1.29V |
| 32 | 1.26V |
| 31 | 1.23V |
| 30 | 1.2V |

FIG. 8B

820

| BRIGHTNESS OF THE DISPLAY PANEL | $V_{Adim}(R_B)$ |
|---|---|
| 30 | 2.44V |
| 29 | 2.40V |
| 28 | 2.36V |
| 27 | 2.32V |
| ... | ... |
| 4 | 1.36V |
| 3 | 1.32V |
| 2 | 1.28V |
| 1 | 1.24V |
| 0(MINIMUM BRIGHTNESS) | 1.2V |

DISPLAY APPARATUS AND METHOD FOR CONTROLLING DISPLAY APPARATUS

CROSS-REFERENCE TO RELATED APPLICATIONS

This application is a continuation of International Application No. PCT/KR2022/017990, designating the United States, filed on Nov. 15, 2022, in the Korean Intellectual Property Receiving Office and claiming priority to Korean Patent Application No. 10-2021-0157893, filed on Nov. 16, 2021, in the Korean Intellectual Property Office, the disclosures of each of which are incorporated by reference herein in their entireties.

BACKGROUND

Field

The disclosure relates to a display apparatus and a method for controlling the display apparatus, and more particularly, to a display apparatus that adjusts the entire sections of brightness of a display panel by analog dimming control, and a method for controlling the display apparatus.

Description of Related Art

Brightness of a display panel is adjusted based on a driving current provided to light-emitting elements by a driver. Specifically, a driving current may be adjusted by analog dimming control or pulse width modulation dimming control.

Here, analog dimming control is a method of adjusting the brightness of a display panel by varying the amplitude of a driving current provided to light-emitting elements. Also, pulse width modulation dimming control is a method of adjusting the brightness of a display panel by providing a driving current provided to light-emitting elements in a form of a square wave, and varying a duty ratio of the square wave.

Meanwhile, unlike a high-priced driver that adjusts the amplitude of a driving current based on a digital signal received from a processor, a low-priced driver adjusts the amplitude of a driving current based on a DC signal received from a processor.

Here, in the case of a low-priced driver, the size of a DC signal that can be recognized may be limited according to the specifications of components such as an FET and a TR inside. Accordingly, there is a case wherein the entire sections of brightness of a display panel cannot be adjusted by analog dimming control.

In this case, the sections of brightness of a display panel that cannot be adjusted by analog dimming control should be adjusted by pulse width modulation dimming control.

Meanwhile, in the case of adjusting a display panel with pulse width modulation control, a flicker phenomenon may occur in the display panel, and there are research results showing that this makes fatigue accumulated in the eyes of the user of the display apparatus.

Accordingly, making the entire sections of brightness of a display panel adjusted by analog dimming control in a low-priced driver is an important issue.

SUMMARY

The disclosure was devised for resolving the aforementioned problem, and the purpose of the disclosure is in providing a display apparatus wherein the entire sections of brightness of a display panel can be adjusted by analog dimming control by setting an output resistor based on the brightness of the display panel, and a method for controlling thereof.

A display apparatus according to an embodiment of the disclosure for achieving the aforementioned purpose includes a display panel, a backlight unit configured to provide light to the display panel by using a plurality of light-emitting elements, a driver configured to provide a driving current to the plurality of light-emitting elements based on an amplitude of a driving voltage, a memory storing information about an amplitude of a driving voltage according to a plurality of brightnesses for each resistance value of an output resistor connected to the driver, and a processor configured to set a resistance value of the output resistor based on a brightness value of the display panel, identify an amplitude of the driving voltage corresponding to the brightness value of the display panel among amplitudes of the driving voltage according to the plurality of brightnesses corresponding to the set resistance value based on the information stored in the memory, and apply the driving voltage of the identified amplitude to the driver, wherein an amplitude of the driving current is determined based on the amplitude of the driving voltage and the resistance value of the output resistor.

Meanwhile, the brightness value of the display panel may be set within a brightness range until a second brightness value increasing in stages from a first brightness value, and the processor may, based on the brightness value of the display panel being smaller than or equal to a predetermined brightness value, set the resistance value of the output resistor as a first resistance value, and based on the brightness value of the display panel being greater than the predetermined brightness value, set the resistance value of the output resistor as a second resistance value, and the predetermined brightness value may be greater than the first brightness value and smaller than the second brightness value.

In this case, the processor may, based on the brightness value of the display panel changing to a value smaller than or equal to the predetermined brightness value based on a user input, change the resistance value of the output resistor set as the second resistance value to the first resistance value, and based on the brightness value of the display panel changing to a value greater than the predetermined brightness value based on a user input, change the resistance value of the output resistor set as the first resistance value to the second resistance value.

Also, the amplitude of the driving current may be relatively bigger in a case wherein the resistance value of the output resistor is set as the second resistance value than a case wherein the resistance value of the output resistor is set as the first resistance value.

In addition, based on the brightness value of the display panel being set in stages from the first brightness value to the predetermined brightness value, the amplitude of the driving voltage according to a plurality of brightness values corresponding to the first resistance value may be set such that the amplitude of the driving current continuously increases, based on the brightness value of the display panel being set in stages from a third brightness value to the second brightness value, the amplitude of the driving voltage according to a plurality of brightness values corresponding to the second resistance value may be set such that the amplitude of the driving current continuously increases, and the third brightness value may be a brightness value in a next stage of the predetermined brightness value.

Here, based on the brightness value of the display panel being set in stages from the first brightness value to the second brightness value, brightness of the display panel may continuously increase according to the driving current.

Meanwhile, the processor may, based on the display apparatus being turned on, identify a brightness value of the display panel set as a default, and set the resistance value of the output resistor based on the identified brightness value.

Also, a method for controlling a display apparatus including a display panel, a backlight unit configured to provide light to the display panel by using a plurality of light-emitting elements, and a driver configured to provide a driving current to the plurality of light-emitting elements according to an embodiment of the disclosure includes the steps of setting a resistance value of an output resistor connected to the driver based on a brightness value of the display panel, based on information about an amplitude of a driving voltage according to a plurality of brightnesses for each resistance value of the output resistor, identifying an amplitude of the driving voltage corresponding to the brightness value of the display panel among amplitudes of the driving voltage according to the plurality of brightnesses corresponding to the set resistance value, and applying the driving voltage of the identified amplitude to the driver, and providing the driving current to the plurality of light-emitting elements based on the amplitude of the applied driving voltage.

Meanwhile, the brightness value of the display panel may be set within a brightness range until a second brightness value increasing in stages from a first brightness value, and in the setting step, based on the brightness value of the display panel being smaller than or equal to a predetermined brightness value, the resistance value of the output resistor may be set as a first resistance value, and based on the brightness value of the display panel being greater than the predetermined brightness value, the resistance value of the output resistor may be set as a second resistance value, and the predetermined brightness value may be greater than the first brightness value and smaller than the second brightness value.

In this case, in the setting step, based on the brightness value of the display panel changing to a value smaller than or equal to the predetermined brightness value based on a user input, the resistance value of the output resistor set as the second resistance value may be changed to the first resistance value, and based on the brightness value of the display panel changing to a value greater than the predetermined brightness value based on a user input, the resistance value of the output resistor set as the first resistance value may be changed to the second resistance value.

Also, the amplitude of the driving current may be relatively bigger in a case wherein the resistance value of the output resistor is set as the second resistance value than a case wherein the resistance value of the output resistor is set as the first resistance value.

In addition, based on the brightness value of the display panel being set in stages from the first brightness value to the predetermined brightness value, the amplitude of the driving voltage according to the plurality of brightness values corresponding to the first resistance value may be set such that the amplitude of the driving current continuously increases, and based on the brightness value of the display panel being set in stages from a third brightness value to the second brightness value, the amplitude of the driving voltage according to the plurality of brightness values corresponding to the second resistance value may be set such that the amplitude of the driving current continuously increases, and the third brightness value may be a brightness value in a next stage of the predetermined brightness value.

Here, based on the brightness value of the display panel being set in stages from the first brightness value to the second brightness value, the brightness of the display panel may continuously increase according to the driving current.

Meanwhile, in the setting step, based on the display apparatus being turned on, a brightness value of the display panel set as a default may be identified, and the resistance value of the output resistor may be set based on the identified brightness value.

According to the various embodiments of the disclosure, the entire range of the brightness of a display panel can be adjusted just by analog dimming control, and thus increase of fatigue of the eyes of a user by flickers generated by pulse width modulation control can be prevented.

BRIEF DESCRIPTION OF THE DRAWINGS

FIG. 8A and FIG. 8B are diagrams for illustrating information about an amplitude of a driving voltage according to a plurality of brightnesses for each resistance value of an output resistor according to an embodiment of the disclosure;

DETAILED DESCRIPTION

Figure 1:
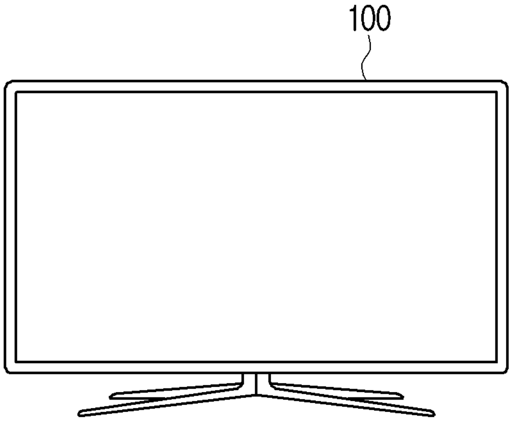
FIG. 1 is a diagram for illustrating a display apparatus according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, and/or alternatives of the embodiments of the disclosure. Meanwhile, with respect to the detailed description of the drawings, similar components may be designated by similar reference numerals.

Also, in describing the disclosure, in case it is determined that detailed explanation of related known functions or components may unnecessarily confuse the gist of the disclosure, the detailed explanation will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, terms used in the disclosure are used just to explain specific embodiments, and are not intended to limit the scope of the disclosure. Also, singular expressions include plural expressions, unless defined obviously differently in the context.

In addition, in the disclosure, expressions such as "have," "may have," "include," and "may include" denote the existence of such characteristics (e.g.: elements such as numbers, functions, operations, and components), and do not exclude the existence of additional characteristics.

Also, in the disclosure, the expressions "A or B," "at least one of A and/or B," or "one or more of A and/or B," and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, the expressions "first," "second," and the like used in the disclosure may describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Also, in the embodiments of the disclosure, 'a module' or 'a part' may perform at least one function or operation, and may be implemented as hardware or software, or as a combination of hardware and software. In addition, a plurality of 'modules' or 'parts' may be integrated into at least one module and implemented as at least one processor, excluding 'a module' or 'a part' that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, embodiments according to the disclosure will be described in detail with reference to the accompanying drawings, such that a person having ordinary knowledge in the technical field to which the disclosure belongs can easily carry out the embodiments.

FIG. 1 is a diagram for illustrating a display apparatus according to an embodiment of the disclosure.

A display apparatus 100 may be implemented as a TV, a smartphone, a tablet, etc. Also, the display apparatus 100 may display a screen through a display panel.

Also, the display apparatus 100 may include a backlight unit that provides light to the display panel by using a plurality of light-emitting elements. In this case, the plurality of light-emitting elements of the backlight unit may emit light by a driving current provided to the plurality of light-emitting elements.

Meanwhile, the brightness of the display panel of the display apparatus 100 may be adjusted by analog dimming control. In this case, the brightness of the display panel may be determined in proportion to the amplitude of a driving current. Also, the amplitude of a driving current may be determined based on the amplitude of a driving voltage applied to a driver and a resistance value of an output resistor connected to the driver.

Meanwhile, according to the specifications of components such as an FET and a TR inside the driver, the amplitude of an applied driving voltage that can be recognized by the driver may be restricted. Also, if a value of the output resistor is fixed to a specific value, the range of the amplitude of a driving current determined based on a driving voltage and the output resistor may also be restrictive.

Accordingly, the range of the brightness of the display panel determined according to the amplitude of a driving current in a restricted range may fall under a partial range in a brightness range of the display panel that can be set.

For example, in case the range of brightness values of the display panel that can be set is from 0 to 100, the range of brightness values of the display panel determined according to a driving current having an amplitude of a restricted range may be from 31 to 100.

Accordingly, the display apparatus 100 according to an embodiment of the disclosure may set a resistance value of the output resistor based on a brightness value of the display panel, and identify the amplitude of a driving voltage corresponding to the brightness value of the display panel among amplitudes of the driving voltage according to a plurality of brightnesses corresponding to the set resistance value, and apply the driving voltage in the identified amplitude to the driver.

As described above, according to an embodiment of the disclosure, the range of the amplitude of a driving current provided to the plurality of light-emitting elements can be extended, and thus the display apparatus 100 can adjust the entire range of brightnesses of the display panel just by analog dimming control. That is, according to an embodiment of the disclosure, increase of fatigue of the eyes of a user by flickers generated by pulse width modulation control can be prevented.

Figure 2:
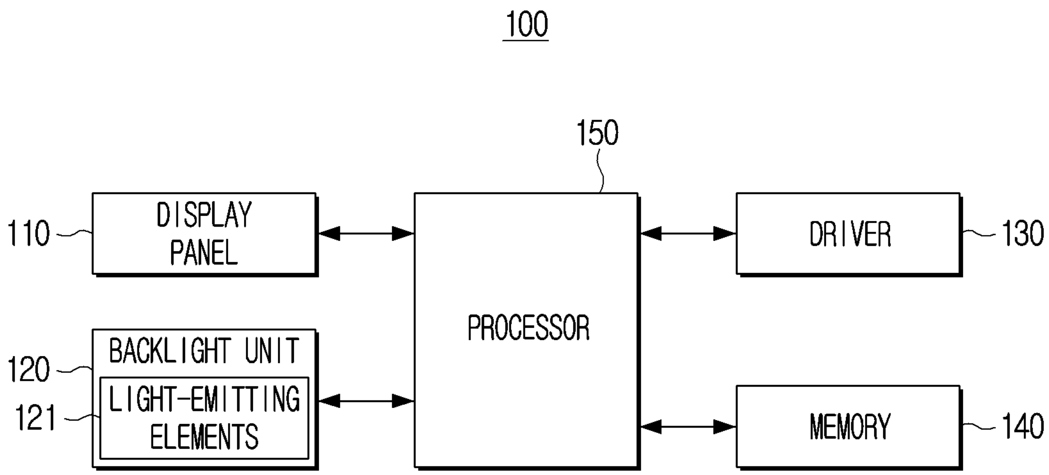
FIG. 2 is a block diagram for illustrating a configuration of a display apparatus according to an embodiment of the disclosure.

FIG. 2 is a block diagram for illustrating a configuration of a display apparatus according to an embodiment of the disclosure.

The display panel 110 may display a screen. For this, the display panel 110 may be implemented as display panels 110 in various types such as a liquid crystal display (LCD).

The backlight unit 120 may provide light to the display panel 110 by using the plurality of light-emitting elements. For this, the backlight unit 120 may include light-emitting elements in various types such as solid light-emitting diodes (LEDs).

The driver 130 may provide a driving current to the plurality of light-emitting elements of the backlight unit 120. For this, the driver 130 may be connected with a DC to DC converter for generating a driving current.

Figure 3:
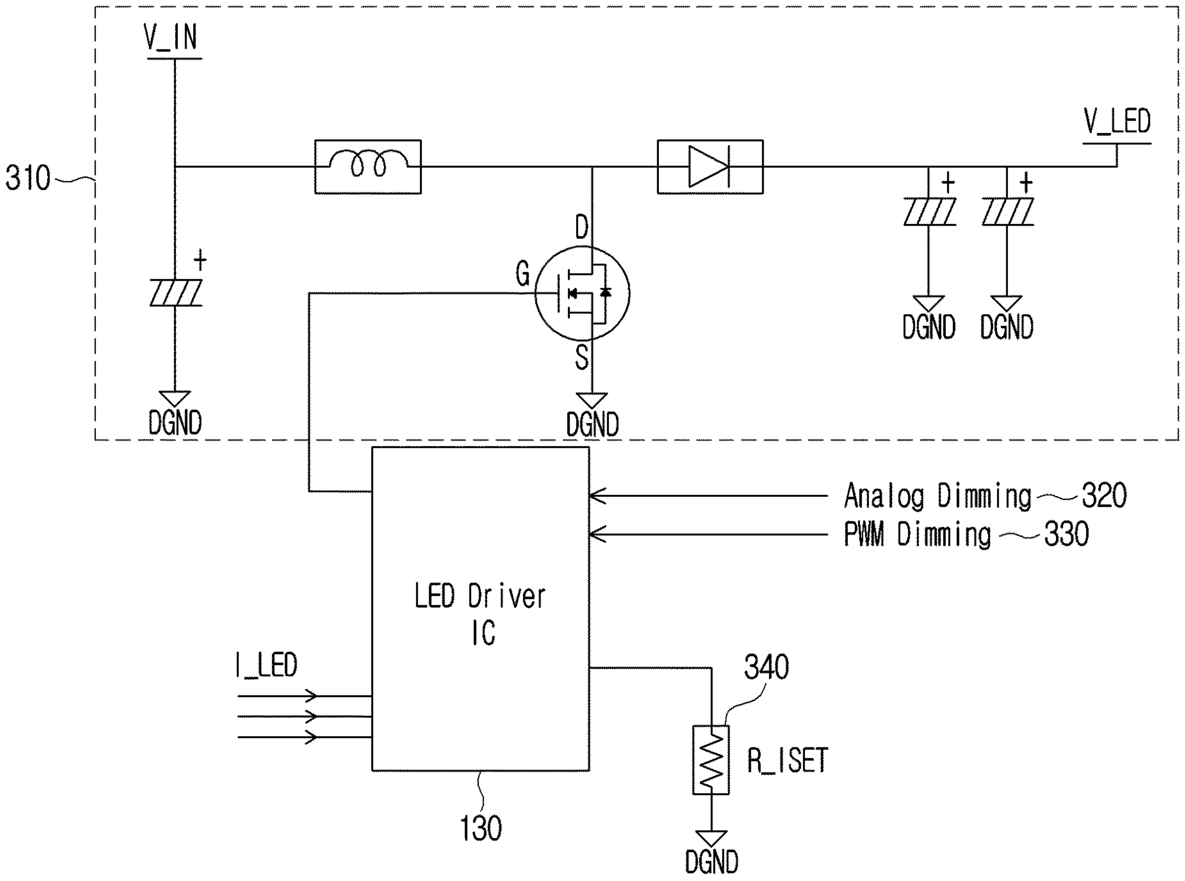
FIG. 3 is a diagram for illustrating a driver 130 according to an embodiment of the disclosure.

For example, referring to FIG. 3, the driver 130 may be connected with a buck-boost converter 310 through one terminal among a plurality of terminals. Also, the buck-boost converter 310 may apply a voltage (V_LED) to the plurality of light-emitting elements of the backlight unit based on a gate voltage received from the driver 130. Accordingly, a driving current may flow in the plurality of light-emitting elements.

Meanwhile, the amplitude of a driving current may be determined based on the amplitude of a driving voltage applied to the driver 130 and a resistance value of the output resistor 340. Specifically, the amplitude of a driving current may be calculated by the formula as follows.

$$I_{LED} = k\frac{V_{Admin}}{R_{ISET}} \times \text{duty}_{pdim} \quad \text{[Formula 1]}$$

Here, $I_{LED}$ means a driving current flowing in the plurality of light-emitting elements.

K is a coefficient according to the characteristic of the driver 130, and may have an intrinsic value.

$A_{dim}$ means a driving voltage which is a signal 320 applied to an analog dimming terminal.

$R_{ISET}$ means a resistance value of the output resistor 340 connected to the driver 130.

$\text{duty}_{pdim}$ means a duty ratio which is a signal 330 applied to a pulse width modulation dimming terminal, and in case the brightness of the display panel 110 is adjusted by analog dimming control, $\text{duty}_{pdim}$ may have a value of 1.

In the memory 140, data for operations of the display apparatus 100 may be stored. In particular, in the memory 140, information about the amplitudes of a driving voltage according to a plurality of brightnesses for each resistance value of the output resistor 340 connected to the driver 130 may be stored, and detailed explanation in this regard will be described later.

Also, in the memory 140, at least one instruction regarding the display apparatus 100 may be stored. In addition, in the memory 140, an operating system (O/S) for driving the display apparatus 100 may be stored. Further, in the memory 140, various kinds of software programs or applications for the display apparatus 100 to operate according to the various embodiments of the disclosure may be stored. For this, the memory 140 may store a semiconductor memory such as a volatile memory, a flash memory, etc., or a magnetic storage medium such as a hard disk, etc.

The processor 150 may be electrically connected with the display panel 110, the backlight unit 120, the driver 130, and the memory 140, and control the overall operations and functions of the display apparatus 100.

For this, the processor 150 may include a central processing unit (CPU) or an application processor (AP), and may execute one or more software programs stored in the memory 140 according to the at least one instruction stored in the memory 140 of the display apparatus 100.

First, the processor 150 may set a resistance value of the output resistor based on a brightness value of the display panel 110.

Here, the brightness value of the display panel 110 may be set within a brightness range until a second brightness value increasing in stages from a first brightness value. Here, the first brightness value may be a minimum brightness value that can be set in the display panel 110, and the second brightness value may be maximum brightness value that can be set in the display panel 110.

For example, in case the minimum brightness value that can be set in the display panel 110 is 0, and the maximum brightness value that can be set is 100, the brightness value of the display panel 110 may be set as a value from 0 to 100.

Also, the brightness value of the display panel 110 may be set based on a user instruction. Specifically, the processor 150 may receive a user's instruction input through a user inputter (not shown), and set a brightness value corresponding to the received instruction as the brightness value of the display panel 110.

Also, when the display apparatus 100 is turned on, the processor 150 may identify the brightness value of the display panel 110 set as a default, and set a resistance value of the output resistor 340 based on the identified brightness value.

For this, the memory 140 may include information about the brightness value of the display panel 110 set as the default. Here, the brightness value of the display panel 110 set as the default may be the brightness value of the display panel 110 before the display apparatus 100 was turned off.

For this, the processor 150 may store the information about the brightness of the display panel 110 currently set in the memory 140 when the display apparatus 100 is in a turned-on state.

Then, the processor 150 may set the resistance value of the output resistor 340 based on the identified brightness of the display panel 110.

Specifically, in case the set brightness value of the display panel 110 is smaller than or equal to a predetermined brightness value, the processor 150 may set the resistance value of the output resistor 340 as a first resistance value, and in case the brightness value of the display panel 110 is greater than the predetermined brightness value, the processor 150 may set the resistance value of the output resistor 340 as a second resistance value.

Also, if the brightness value of the display panel 110 is changed to a value smaller than or equal to the predetermined brightness value based on a user input, the processor 150 may change the resistance value of the output resistor 340 set as the second resistance value to the first resistance value, and if the brightness value of the display panel 110 is changed to a value greater than the predetermined brightness value based on a user input, the processor 150 may change the resistance value of the output resistor 340 set as the first resistance value to the second resistance value.

For this, the output resistor 340 may be constituted as a variable resistance circuit of which resistance value may change. Specifically, a resistance value of the output resistor 340 may be set based on a signal received from the processor 150.

Figure 4:
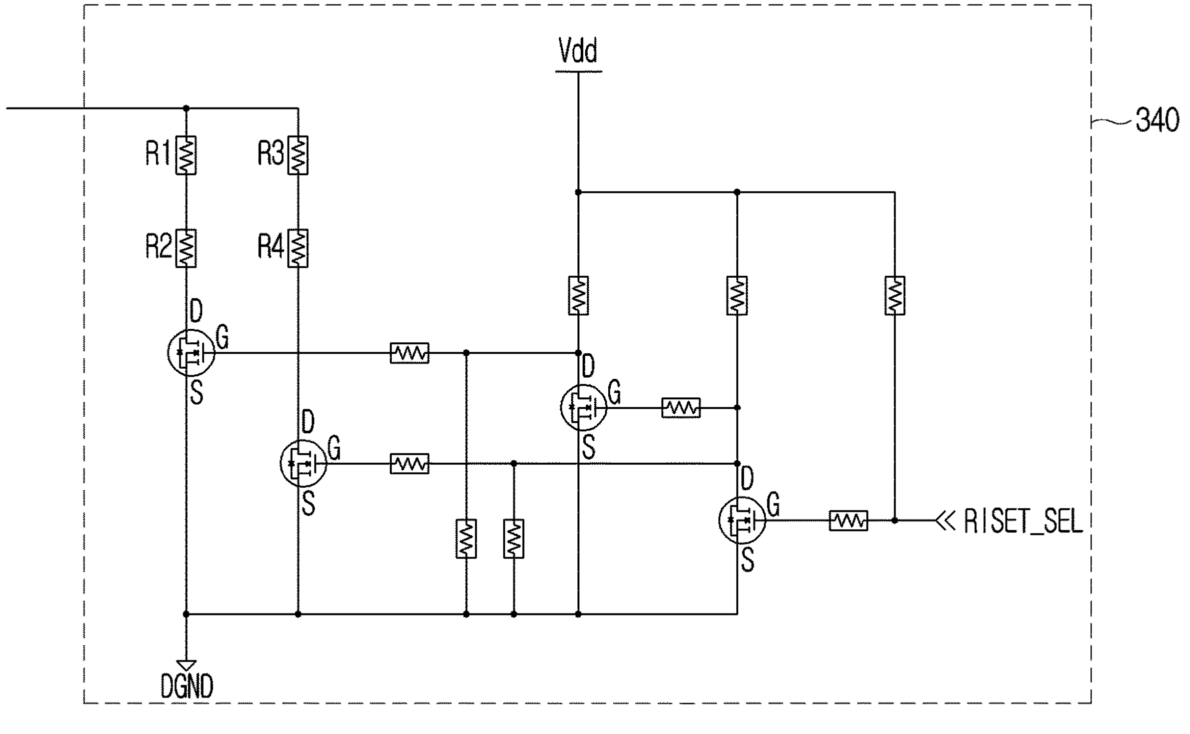
FIG. 4 is a diagram for illustrating an output resistor according to an embodiment of the disclosure.

For example, as in FIG. 4, the output resistor 340 may be constituted as a variable resistance circuit that may have a resistance value of R1+R2 or a resistance value of R3+R4. In this case, the processor 150 may set the resistance value of the output resistor 340 as R1+R2 or set it as R3+R4 by applying an RISET_SEL signal to the variable resistance circuit.

As an example, if an RISET_SEL signal is applied to the variable resistance circuit as a high signal (e.g., 3.3V), the resistance value of the output resistor 340 may be set as R1+R2. As another example, if an RISET_SEL signal is applied to the variable resistance circuit as a low signal (e.g., 0V), the resistance value of the output resistor 340 may be set as R3+R4.

Here, the variable resistance circuit in FIG. 4 is merely an example for setting a resistance value of the output resistor 340, and is not necessarily limited thereto. That is, the output resistor 340 may be constituted as various circuits of which resistance values may change based on a signal received from the processor 150.

Meanwhile, the amplitude of a driving current may be relatively bigger in a case wherein the resistance value of the output resistor is set as the second resistance value than a case wherein the resistance value of the output resistor is set as the first resistance value. In this case, the first resistance value may have a bigger value than the second resistance value.

Figure 5:
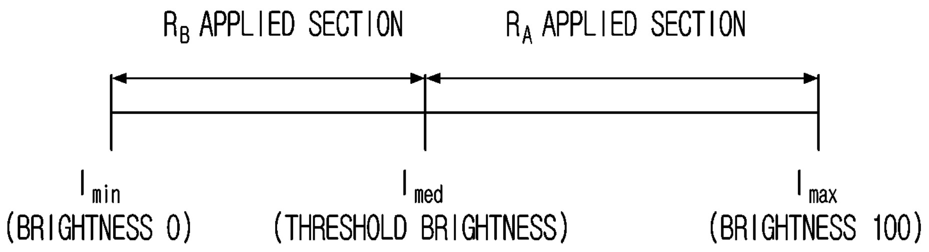
FIG. 5 is a diagram for illustrating an amplitude of a driving current for each brightness of a display panel according to an embodiment of the disclosure.

For example, as in FIG. 5, in case the brightness of the display panel 110 is greater than a predetermined brightness (a threshold brightness), the resistance value of the variable resistor 340 may be set as $R_A$, and in case the brightness of the display panel 110 is smaller than or equal to the predetermined brightness (the threshold brightness), the resistance value of the variable resistor 340 may be set as $R_B$. Also, the amplitude of a driving current may be bigger than $I_{med}$ in a case wherein the variable resistor 340 is set as $R_A$, and smaller than or equal to $I_{med}$ in a case wherein the variable resistor 340 is set as $R_B$.

For this, the predetermined brightness value may be one of brightness values of the display panel 110 that are determined according to amplitudes of a driving current in an overlapping range between a range of amplitudes of a driving current that can be provided to the plurality of light-emitting elements by the driver 130 when the resistance value of the output resistor is the first resistance value and a range of amplitudes of a driving current that can be provided to the plurality of light-emitting elements by the driver 130 when the resistance value of the output resistor is the second resistance value.

Figure 6:
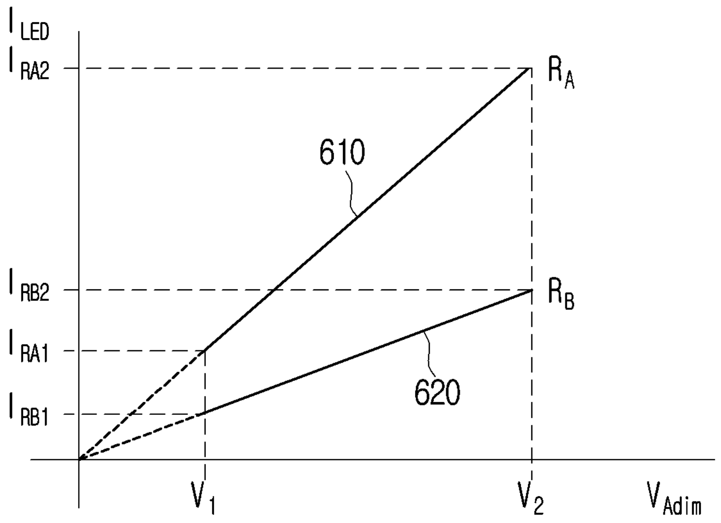
FIG. 6 is a diagram for illustrating an amplitude of a driving current for each resistance value of an output resistor according to an embodiment of the disclosure.

For example, as in FIG. 6, when a driving voltage is applied to the driver 130 from V1 to V2, if the resistance value of the output resistor 340 is $R_A$, the amplitude of a driving current may have a size from $I_{RA1}$ to $I_{RB2}$ as in the graph 610. Also, when a driving voltage is applied to the driver 130 from V1 to V2, if the resistance value of the output resistor 340 is $R_B$, the amplitude of a driving current may have a size from $I_{RA1}$ to $I_{RB2}$ as in the graph 620.

In this case, the amplitude of the driving current in the range from $I_{RA1}$ to $I_{RB2}$ is a range wherein the range of the amplitude of the driving current in case the resistance value of the output resistor 340 is $R_A$ and the range of the amplitude of the driving current in case the resistance value of the output resistor 340 is $R_B$ overlap. Accordingly, the predetermined brightness value may be the brightness value of the display panel 110 that is determined according to a driving current when the amplitude of the driving current has any value within the range from $I_{RA1}$ to $I_{RB2}$.

In this case, the predetermined brightness value may be the minimum brightness among the brightness values of the display panel 110 that are determined according to the amplitudes of a driving current in an overlapping range.

Specifically, if the resistance value of the output resistor is the second resistance value, and the minimum voltage among the ranges of voltages that can be applied to the driver 130 is applied to the driver 130, the brightness value of the display panel 110 that is determined according to a driving current may be the predetermined brightness value.

For example, as in FIG. 6, a case wherein the amplitudes of a driving current in an overlapping range are from $I_{RA1}$ to $I_{RB2}$ is assumed. In this case, the predetermined brightness value may be the brightness value of the display panel 110 that is determined according to $I_{RA1}$ that has the lowest amplitude within the range from $I_{RA1}$ to $I_{RB2}$.

In this case, $I_{RA1}$ may be the amplitude of a driving current when the resistance value of the output resistor 340 is $R_A$, and V1 which is the minimum voltage in the range of a driving voltage (from V1 to V2) that can be applied to the driver 130 is applied to the driver 130.

Also, the predetermined brightness value may be the brightness value of the display panel 110 that is determined according to a driving current having an amplitude of $I_{RA1}$.

Here, when the resistance value of the output resistor is $R_B$, $V_x$ which is the amplitude of a voltage applied to the driver for providing a driving current having an amplitude of $I_{RA1}$ to the light-emitting elements may be determined based on the following formula 2.

$$I_{RA1} = \frac{kV_1}{R_A} = \frac{kV_x}{R_B} \qquad \text{[Formula 2]}$$

$$V_x = \frac{R_B V_1}{R_A}$$

As described above, according to an embodiment of the disclosure, the display apparatus 100 can extend the range of amplitudes of a driving current by changing resistance values of the output resistor, and thus the range of the brightness of the display panel 110 wherein the brightness can be controlled by analog dimming control can be increased.

Meanwhile, the processor 150 may identify the amplitude of a driving voltage corresponding to the brightness value of the display panel 110 among the amplitudes of the driving voltage according to a plurality of brightnesses corresponding to resistance values set based on the information stored in the memory 140.

For this, the memory 140 may store information about the amplitudes of a driving voltage according to a plurality of brightnesses for each of the first resistance value and the second resistance value.

In this case, if the brightness value of the display panel 110 is set in stages from the first brightness value to the predetermined brightness value, the amplitude of a driving voltage according to a plurality of brightness values corresponding to the first resistance value may be set such that the amplitude of a driving current continuously increases.

Also, in case the brightness value of the display panel 110 is set in stages from a third brightness value to the second brightness value, the amplitude of a driving voltage according to a plurality of brightness values corresponding to the second resistance value may be set such that the amplitude of a driving current continuously increases.

Here, the third brightness value may be a brightness value in a next stage of the predetermined brightness value.

Also, in case the brightness value of the display panel 110 is set in stages from the first brightness value to the second brightness value, the brightness of the display panel 110 may continuously increase according to a driving current.

Figure 7A:
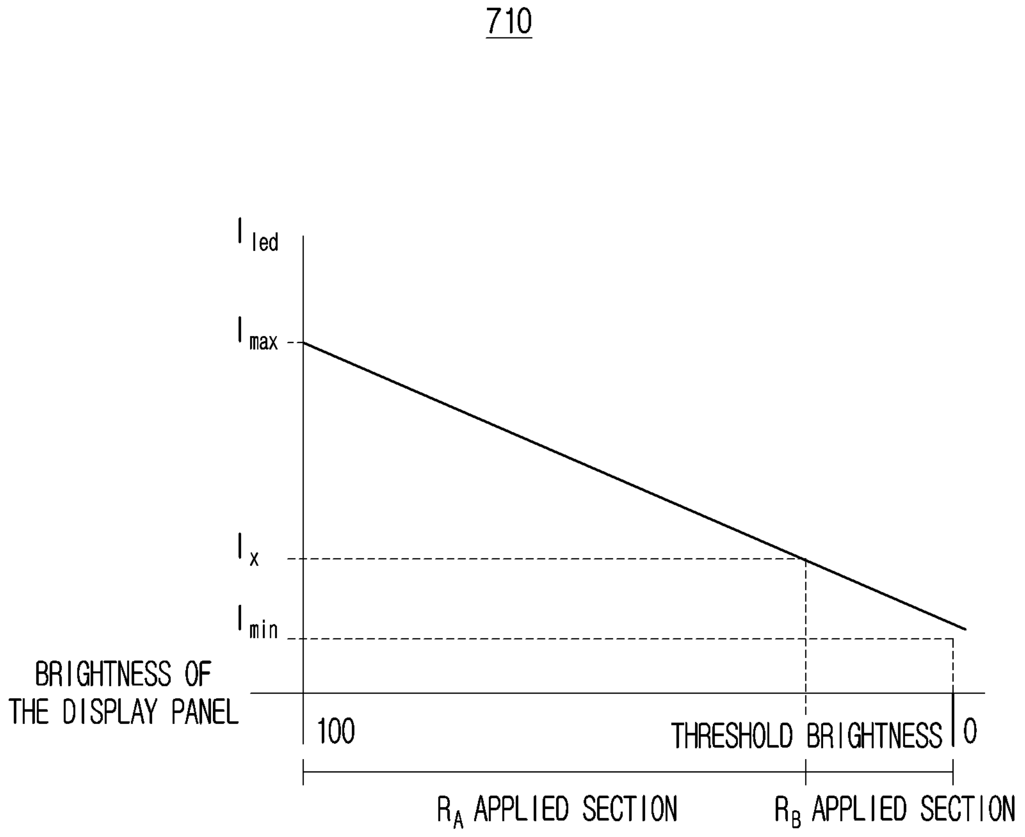
FIG. 7A is a diagram for illustrating a driving current according to brightnesses of a plurality of display panels according to an embodiment of the disclosure.

For example, as in the graph 710 in FIG. 7A, the brightness of the display panel 110 may be determined according to the amplitude of a driving current. Here, if the brightness value of the display panel 110 is smaller than or equal to the threshold brightness, in case the resistance value of the output resistor is set as $R_A$, and the brightness value of the display panel 110 is greater than the threshold brightness, the resistance value of the output resistor may be set as $R_B$.

In this case, the amplitude of the driving current may continuously increase as the brightness value of the display panel 110 increases from the threshold brightness to 30, and may continuously increase as the brightness value of the display panel 110 increases from the threshold brightness to 100.

Also, the amplitude of the driving current may continuously increase as the brightness value of the display panel 110 increases from 0 to 100. That is, the amplitude of the driving current may continuously increase as the brightness value increases in the entire sections of the brightnesses that can be set in the display panel 110.

Meanwhile, for determining a driving current as in the graph 710 in FIG. 7A, a driving voltage applied to the driver 130 may be determined for each resistance value of the output resistor based on formula 1.

Figure 7B:
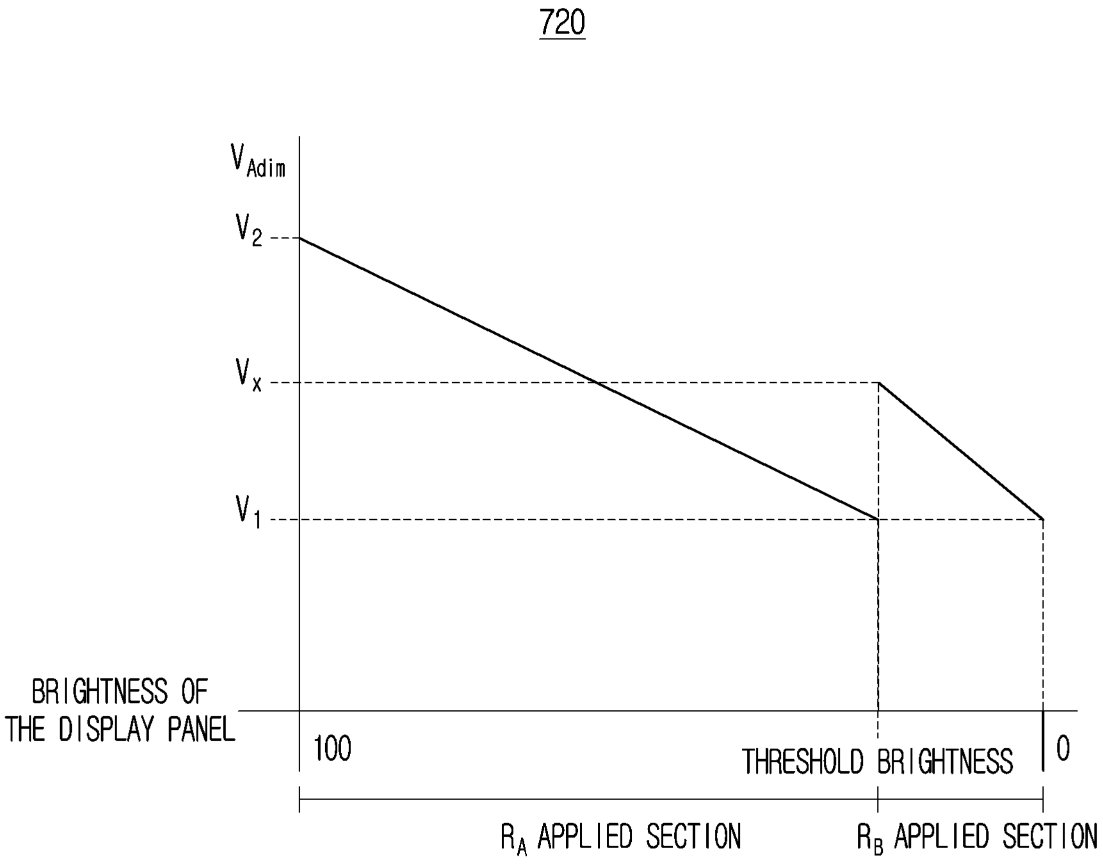
FIG. 7B is a diagram for illustrating an amplitude of a driving voltage according to brightnesses of a plurality of display panels according to an embodiment of the disclosure.

For example, as in the graph 720 in FIG. 7B, an amplitude of a driving voltage according to the plurality of brightnesses of the display panel 110 in a case wherein the resistance value of the output resistor is RA may be determined, and an amplitude of a driving voltage according to the plurality of brightnesses of the display panel 110 in a case wherein the resistance value of the output resistor is RB may be determined. Here, the value of $V_x$ may be determined based on formula 2, as described above.

Also, information about the amplitudes of a driving voltage according to the plurality of brightnesses of the display panel 110 may be matched for each resistance value of the output resistor and stored in the memory 140.

In this case, the brightness values of the display panel 110 that are matched with the amplitudes of a driving voltage and stored in the memory 140 may fall under a stage of the brightnesses that can be set in the display panel 110. For example, if the brightnesses of a stage that can be set in the display panel 110 are from 0 to 100 by an interval of 1, the brightness values of the display panel 110 that are matched with the amplitudes of a driving voltage and stored in the memory 140 may be from 0 to 100 by an interval of 1.

Also, the processor 150 may identify the amplitude of a driving voltage corresponding to the brightness value of the display panel 110 that is currently set among the amplitudes of a driving voltage according to a plurality of brightnesses of a resistance value set based on the information stored in the memory 140.

For example, as in FIG. 8A and FIG. 8B, the memory 140 may include information 810 about the amplitudes of a driving voltage according to the plurality of brightnesses of the display panel 110 in case the resistance value of the output resistor is $R_A$, and information 820 about the amplitudes of a driving voltage according to the plurality of brightnesses of the display panel 110 in case the resistance value of the output resistor is $R_B$.

As an example, a case wherein the brightness value of the display panel 110 is set as 97 is assumed. In this case, as in FIG. 8A, from the information 810 about the amplitudes of a driving voltage according to the plurality of brightnesses of the display panel 110 in case the resistance value of the output resistor is $R_A$, the processor 150 may identify that the amplitude of a driving voltage 3.24V corresponding to the brightness value of the display panel 110, i.e., 97 is the amplitude of a driving voltage corresponding to the brightness value of the display panel 110.

As another example, a case wherein the brightness value of the display panel 110 is set as 4 is assumed. In this case, as in FIG. 8B, from the information 820 about the amplitudes of a driving voltage according to the plurality of brightnesses of the display panel 110 in case the resistance value of the output resistor is $R_B$, the processor 150 may identify that the amplitude of a driving voltage 1.36V corresponding to the brightness value of the display panel 110, i.e., 4 is the amplitude of a driving voltage corresponding to the brightness value of the display panel 110.

Meanwhile, in FIG. 8A and FIG. 8B, the brightness value 30 of the display panel 110 may be the predetermined brightness value. That is, in case the resistance value of the output resistor is $R_A$, the memory 140 may include information about the amplitudes of a driving voltage according to the brightnesses of the display panel 110 wherein the brightnesses are from 100 which is the maximum brightness value to 30 which is the predetermined brightness value, and in case the resistance value of the output resistor is $R_B$, the memory 140 may include information about the amplitudes of a driving voltage according to the brightnesses of the display panel 110 wherein the brightnesses are from 30 which is the predetermined brightness value to 0 which is the minimum brightness value.

However, this is merely an example, and the range of the plurality of brightnesses of the display panel 110 stored in the memory 140 does not need to be restricted. As an example, in case the resistance value of the output resistor is $R_A$, the memory 140 may include information about the amplitudes of a driving voltage according to the brightnesses of the display panel 110 wherein the brightnesses are from 100 which is the maximum brightness value to a value smaller than the predetermined brightness value 30, and in case the resistance value of the output resistor is $R_B$, the memory 140 may include information about the amplitudes of a driving voltage according to the brightnesses of the display panel 110 wherein the brightnesses are from a value greater than the predetermined brightness value to 0 which is the minimum brightness value.

As described above, regarding a driving voltage according to a plurality of brightnesses of the display panel 110 according to an embodiment of the disclosure, a driving current may continuously increase as the brightness of the display panel 110 increases in stages. Accordingly, the display apparatus 100 may linearly adjust the brightness of the display panel 110 by analog dimming control, and can thus provide a more natural experience of brightness control to the user.

Figure 9:
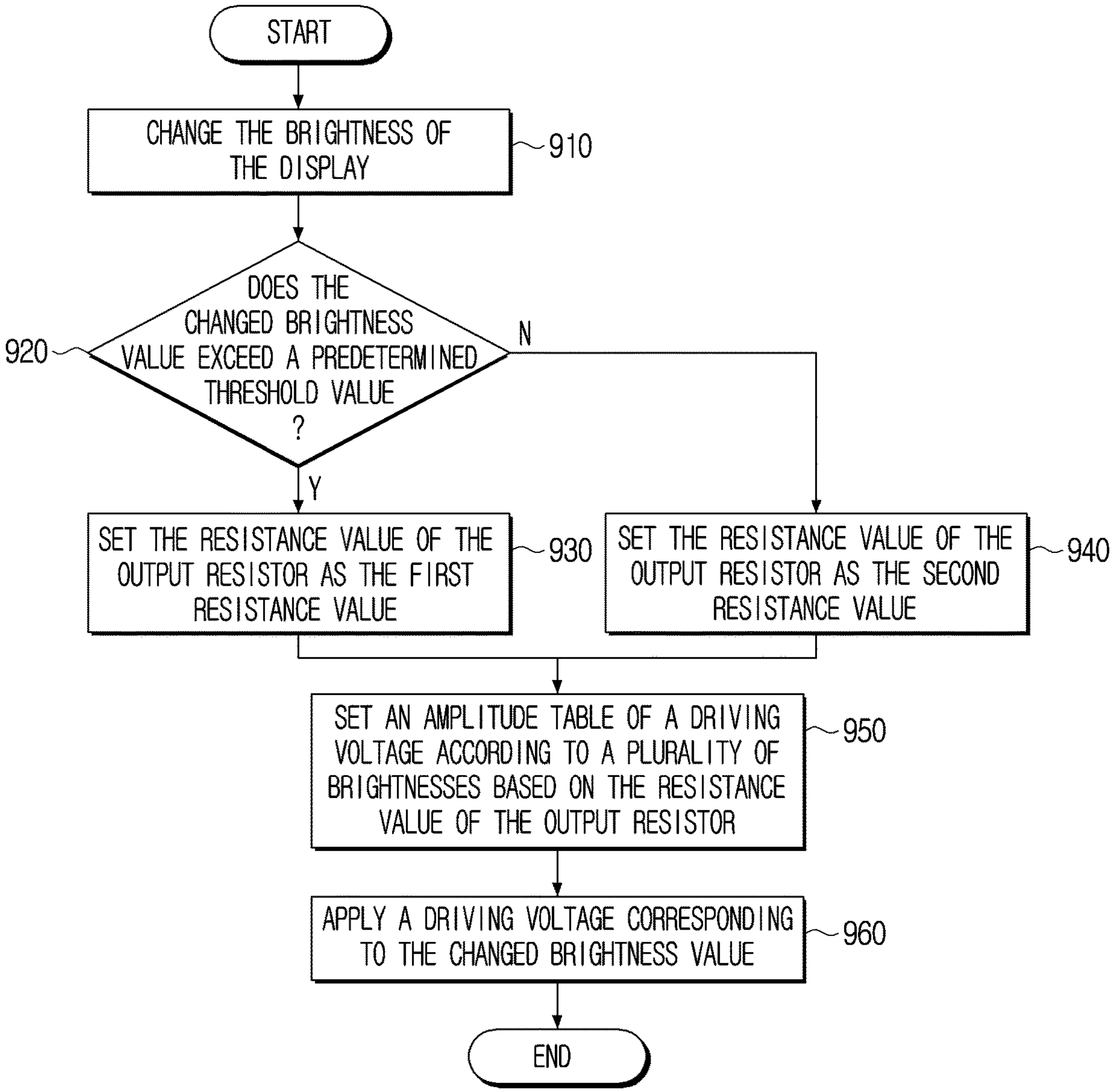
FIG. 9 is a flow chart for illustrating an operation of a display apparatus according to an embodiment of the disclosure.

FIG. 9 is a flow chart for illustrating an operation of a display apparatus according to an embodiment of the disclosure.

First, the processor 150 may change a brightness value of the display panel 110 in operation S910.

Specifically, the processor 150 may receive a user's instruction input through the user inputter (not shown), and change a brightness value corresponding to the received instruction as the brightness value of the display panel 110.

Then, the processor 150 may identify whether the changed brightness value exceeds a predetermined brightness value in operation S920. Here, as the explanation regarding the predetermined brightness value was described above in FIG. 5, detailed explanation will be omitted.

Then, if it is identified that the changed brightness value exceeded the predetermined brightness value in operation S920-Y, the processor 150 may identify that the resistance value of the output resistor is the second resistance value in operation S930. In contrast, if it is identified that the changed brightness value is smaller than or equal to the predetermined brightness value in operation S920-N, the processor 150 may identify that the resistance value of the output resistor is the first resistance value in operation S940. Here, as the method for setting the resistance value of the output resistor to the first resistance value or the second resistance value was described above in FIG. 4, detailed explanation will be omitted.

Then, the processor 150 may set an amplitude table of a driving voltage according to a plurality of brightnesses based on the resistance value of the output resistor in operation S950. Here, the amplitude table of a driving voltage according to the plurality of brightnesses may be information about the amplitudes of a driving voltage according to the plurality of brightnesses as in FIG. 7A and FIG. 7B.

Then, the processor 150 may apply a driving voltage corresponding to the changed brightness value to the driver 130 in operation S960.

As described above, the display apparatus 100 according to an embodiment of the disclosure can extend the range of amplitudes of a driving current by changing the resistance value of the output resistor when changing the brightness of the display panel 110 to a brightness value of the display panel 110 corresponding to a user instruction, and thus the display apparatus 100 can adjust the entire sections of the brightness of the display panel 110 by analog dimming control.

Figure 10:
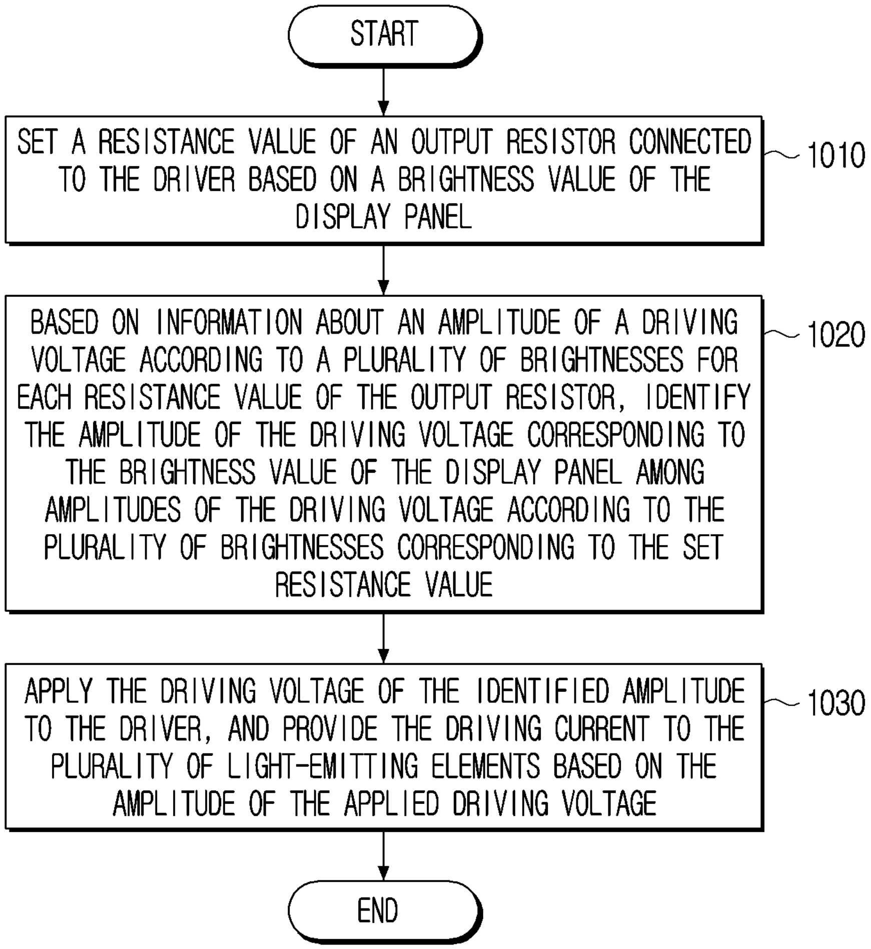
FIG. 10 is a flow chart for illustrating a method for controlling a display apparatus according to an embodiment of the disclosure.

FIG. 10 is a flow chart for illustrating a method for controlling a display apparatus according to an embodiment of the disclosure.

First, a resistance value of the output resistor connected to the driver is set based on a brightness value of the display panel in operation S1010.

Then, an amplitude of a driving voltage corresponding to the brightness value of the display panel among amplitudes of the driving voltage according to the plurality of brightnesses corresponding to the set resistance value is identified based on information about the amplitudes of the driving voltage according to the plurality of brightnesses for each resistance value of the output resistor in operation S1020.

Then, the driving voltage of the identified amplitude is applied to the driver, and a driving current is provided to the plurality of light-emitting elements based on the amplitude of the applied driving voltage in operation S1030.

In this case, the brightness value of the display panel may be set within a brightness range until a second brightness value increasing in stages from a first brightness value.

Also, in the operation S1010, in case the brightness value of the display panel is smaller than or equal to a predetermined brightness value, the resistance value of the output resistor may be set as a first resistance value, and in case the brightness value of the display panel is greater than the predetermined brightness value, the resistance value of the output resistor may be set as a second resistance value.

In this case, the predetermined brightness value may be greater than the first brightness value and smaller than the second brightness value.

Also, in the operation S1010, if the brightness value of the display panel is changed to a value smaller than or equal to the predetermined brightness value based on a user input, the resistance value of the output resistor set as the second resistance value may be changed to the first resistance value.

Further, if the brightness value of the display panel is changed to a value greater than the predetermined brightness value based on a user input, the resistance value of the output resistor set as the first resistance value may be changed to the second resistance value.

In this case, the amplitude of the driving current may be relatively bigger in a case wherein the resistance value of the output resistor is set as the second resistance value than a case wherein the resistance value of the output resistor is set as the first resistance value.

Meanwhile, in case the brightness value of the display panel is set in stages from the first brightness value to the predetermined brightness value, the amplitude of the driving voltage according to the plurality of brightness values corresponding to the first resistance value may be set such that the amplitude of the driving current continuously increases.

Also, in case the brightness value of the display panel is set in stages from a third brightness value to the second brightness value, the amplitude of the driving voltage according to the plurality of brightness values corresponding to the second resistance value may be set such that the amplitude of the driving current continuously increases.

In addition, the third brightness value may be a brightness value in a next stage of the predetermined brightness value.

Further, in case the brightness value of the display panel is set in stages from the first brightness value to the second brightness value, the brightness of the display panel may continuously increase according to the driving current.

Meanwhile, in the operation S1010, when the display apparatus is turned on, a brightness value of the display panel set as a default may be identified, and the resistance value of the output resistor may be set based on the identified brightness value.

As described above, in a method for controlling a display apparatus according to an embodiment of the disclosure, the output resistor is set based on the brightness of the display panel, and thus the entire sections of the brightness of the display panel may be adjusted by analog dimming control.

Figure 11:
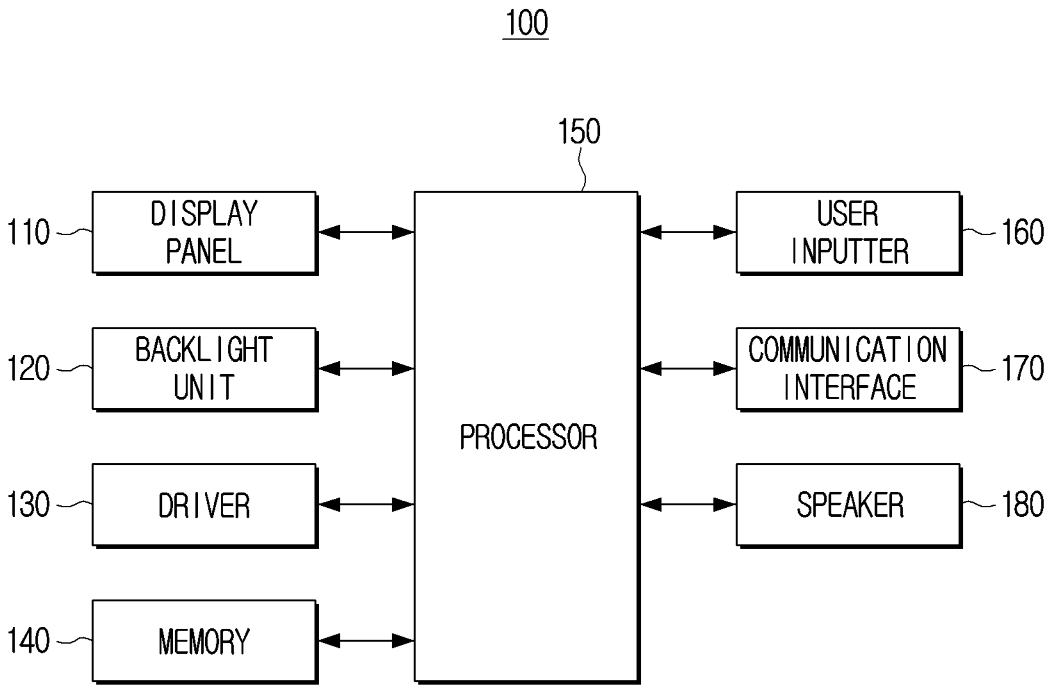
FIG. 11 is a block diagram for illustrating a detailed configuration of a display apparatus according to an embodiment of the disclosure.

FIG. 11 is a block diagram for illustrating a detailed configuration of a display apparatus according to an embodiment of the disclosure.

Referring to FIG. 11, the display apparatus 100 may include a display panel 110, a backlight unit 120, a driver 130, a memory 140, a processor 150, a user inputter 160, a communication interface 170, and a speaker 180. Meanwhile, the components illustrated in FIG. 11 are merely an example, and it is obvious that at least some components can be omitted, or other components can be added depending on embodiments.

Also, as the display panel 110, the backlight unit 120, the driver 130, the memory 140, and the processor 150 were explained in FIG. 1 to FIG. 10, detailed explanation regarding overlapping parts will be omitted.

The user inputter 160 is a component for receiving inputs of various user instructions. For example, the user inputter 160 may include a touch panel, etc. Also, the user inputter 160 may include a remote control signal receiver, and may receive various user instructions from a remote control, etc. for controlling the display apparatus 100.

In this case, the processor 150 may receive a user instruction for setting the brightness of the screen through the user inputter 160. Then, the processor 150 may set the brightness of the screen corresponding to the received user instruction as the brightness of the display panel 110.

The communication interface 170 is a component performing communication with an external apparatus. For example, the communication interface 170 may perform communication with various external apparatuses through a wireless communication method such as Bluetooth (BT), Bluetooth Low Energy (BLE), Wireless Fidelity (WI-FI), Zigbee, etc., or an infrared (IR) communication method. Meanwhile, the communication interface 170 may not only be mounted on the processor 150, but may also be included in the display apparatus 100 as a separate component from the processor 150.

In this case, the processor 150 may transmit data related to the operations of the display apparatus 100 to an external apparatus through the communication interface 170, or receive data from an external apparatus. In this case, the data received from the external apparatus may be image data or audio data that can be reproduced in the display apparatus 100.

The speaker 180 may output an audio signal. For example, the processor 150 may output an audio signal included in the audio data through the speaker 180.

Meanwhile, according to an embodiment of the disclosure, the various embodiments described above may be implemented as software including instructions stored in a machine-readable storage medium which can be read by machines (e.g.: computers). The machines refer to apparatuses that call instructions stored in a storage medium, and can operate according to the called instructions, and the apparatuses may include an apparatus according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by a machine may be provided in the form of a non-transitory storage medium. Here, the term 'a non-transitory storage medium' only means that the storage medium is a tangible apparatus, and does not include a signal (e.g.: an electromagnetic wave), and the term does not distinguish a case wherein data is stored semi-permanently in a storage medium and a case wherein data is stored temporarily. For example, 'a non-transitory storage medium' may include a buffer wherein data is temporarily stored.

Also, according to an embodiment, the method according to the various embodiments described in the disclosure may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed directly between two user apparatuses (e.g.: smartphones), and distributed on-line (e.g.: download or upload) through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display apparatus comprising:
- a display panel;
- a backlight unit configured to provide light to the display panel by using a plurality of light-emitting elements;
- a driver configured to provide a driving current to the plurality of light-emitting elements based on an amplitude of a driving voltage;
- a memory storing information on an amplitude of a driving voltage according to a plurality of brightnesses for each resistance value of an output resistor connected to the driver; and
- a processor configured to:
  - set a resistance value of the output resistor based on a brightness value of the display panel,
  - identify an amplitude of the driving voltage corresponding to the brightness value of the display panel among amplitudes of the driving voltage according to the plurality of brightnesses corresponding to the set resistance value based on the information stored in the memory, and
  - apply the driving voltage of the identified amplitude to the driver,
- wherein
  - an amplitude of the driving current is determined based on the amplitude of the driving voltage and the resistance value of the output resistor,
  - the brightness value of the display panel is set within a brightness range until a second brightness value increasing in stages from a first brightness value, and
  - the processor is configured to:
    - based on the brightness value of the display panel being smaller than or equal to a predetermined brightness value, set the resistance value of the output resistor as a first resistance value, and based on the brightness value of the display panel being greater than the predetermined brightness value, set the resistance value of the output resistor as a second resistance value, and
    - the predetermined brightness value is greater than the first brightness value and smaller than the second brightness value.

2. The display apparatus of claim 1, wherein the processor is configured to:
- based on the brightness value of the display panel changing to a value smaller than or equal to the predetermined brightness value based on a user input, change the resistance value of the output resistor set as the second resistance value to the first resistance value, and
- based on the brightness value of the display panel changing to a value greater than the predetermined brightness value based on a user input, change the resistance value of the output resistor set as the first resistance value to the second resistance value.

3. The display apparatus of claim 1, wherein the amplitude of the driving current is relatively bigger in a case wherein the resistance value of the output resistor is set as the second resistance value than a case wherein the resistance value of the output resistor is set as the first resistance value.

4. The display apparatus of claim 1, wherein, based on the brightness value of the display panel being set in stages from the first brightness value to the predetermined brightness value, the amplitude of the driving voltage according to a plurality of brightness values corresponding to the first resistance value is set such that the amplitude of the driving current continuously increases, based on the brightness value of the display panel being set in stages from a third brightness value to the second brightness value, the amplitude of the driving voltage according to a plurality of brightness values corresponding to the second resistance value is set such that the amplitude of the driving current continuously increases, and the third brightness value is a brightness value in a next stage of the predetermined brightness value.

5. The display apparatus of claim 4, wherein, based on the brightness value of the display panel being set in stages from the first brightness value to the second brightness value, brightness of the display panel continuously increases according to the driving current.

6. The display apparatus of claim 1, wherein the processor is configured to:

based on the display apparatus being turned on, identify a brightness value of the display panel set as a default, and set the resistance value of the output resistor based on the identified brightness value.

7. A method for controlling a display apparatus that includes a display panel, a backlight unit configured to provide light to the display panel by using a plurality of light-emitting elements, and a driver configured to provide a driving current to the plurality of light-emitting elements, the method comprising:

setting a resistance value of an output resistor connected to the driver based on a brightness value of the display panel;

based on information about an amplitude of a driving voltage according to a plurality of brightnesses for each resistance value of the output resistor, identifying an amplitude of the driving voltage corresponding to the brightness value of the display panel among amplitudes of the driving voltage according to the plurality of brightnesses corresponding to the set resistance value; and applying the driving voltage of the identified amplitude to the driver, and providing the driving current to the plurality of light-emitting elements based on the amplitude of the applied driving voltage, wherein the brightness value of the display panel is set within a brightness range until a second brightness value increasing in stages from a first brightness value, and the setting comprises:

based on the brightness value of the display panel being smaller than or equal to a predetermined brightness value, setting the resistance value of the output resistor as a first resistance value, and based on the brightness value of the display panel being greater than the predetermined brightness value, setting the resistance value of the output resistor as a second resistance value, and the predetermined brightness value is greater than the first brightness value and smaller than the second brightness value.

8. The method of claim 7, wherein the setting comprises:

based on the brightness value of the display panel changing to a value smaller than or equal to the predetermined brightness value based on a user input, changing the resistance value of the output resistor set as the second resistance value to the first resistance value; and based on the brightness value of the display panel changing to a value greater than the predetermined brightness value based on a user input, changing the resistance value of the output resistor set as the first resistance value to the second resistance value.

9. The method of claim 7, wherein the amplitude of the driving current is relatively bigger in a case wherein the resistance value of the output resistor is set as the second resistance value than a case wherein the resistance value of the output resistor is set as the first resistance value.

10. The method of claim 7, wherein, based on the brightness value of the display panel being set in stages from the first brightness value to the predetermined brightness value, the amplitude of the driving voltage according to a plurality of brightness values corresponding to the first resistance value is set such that the amplitude of the driving current continuously increases, based on the brightness value of the display panel being set in stages from a third brightness value to the second brightness value, the amplitude of the driving voltage according to a plurality of brightness values corresponding to the second resistance value is set such that the amplitude of the driving current continuously increases, and the third brightness value is a brightness value in a next stage of the predetermined brightness value.

11. The method of claim 10, wherein, based on the brightness value of the display panel being set in stages from the first brightness value to the second brightness value, brightness of the display panel continuously increases according to the driving current.

12. The method of claim 10, wherein the setting comprises:

based on the display apparatus being turned on, identifying a brightness value of the display panel set as a default, and setting the resistance value of the output resistor based on the identified brightness value.

* * * * *